United States Patent [19]

Kimura et al.

[11] Patent Number: 4,693,571

[45] Date of Patent: Sep. 15, 1987

[54] SUPPORT AND DRIVE UNIT FOR MIRROR DEVICES

[75] Inventors: Sakae Kimura, Saitama; Yasuhiro Tanaka, Miyazaki, both of Japan

[73] Assignee: Kabushiki Kaisha Matsuyama Seisakusho, Tokyo, Japan

[21] Appl. No.: 693,865

[22] Filed: Jan. 23, 1985

[30] Foreign Application Priority Data

Jan. 24, 1984 [JP] Japan .................................. 59-11155
Jan. 24, 1984 [JP] Japan .................................. 59-11156

[51] Int. Cl.$^4$ ............................ G02B 5/08; G02B 5/10
[52] U.S. Cl. ...................................... 350/634; 350/637
[58] Field of Search ............... 350/632, 633, 634, 635, 350/636, 637

[56] References Cited

U.S. PATENT DOCUMENTS 4,506,954 3/1985 Enomoto ............................. 350/634
4,555,166 11/1985 Enomoto ............................. 350/634

Primary Examiner—John K. Corbin
Assistant Examiner—Vincent J. Lemmo
Attorney, Agent, or Firm—Irving M. Weiner; Joseph P. Carrier; Pamela S. Burt

[57] ABSTRACT

A support and drive unit for a mirror device having a housing and a mirrored mirror holder, includes a casing adapted to be disposed in the housing, a support structure adapted to pivotally support the mirrored mirror holder, and means for adjusting the mirror holder. The adjusting means comprises first and second actuating rods axially movably mounted on the casing, and a pair of motors disposed in the casing for moving the actuating rods, respectively, through coupling means. The actuating rods have front ends adapted to be pivotally coupled to the mirror holder, and are spaced substantially right-angularly from each other around the center of the support structure. One of the motors is disposed in an area defined between a side of a plane lying through the center of the support structure and a central axis of the first actuating rod and in which the second actuating rod is located, and a side of a plane lying through the center of the support structure and a central axis of the second actuating rod and in which the first actuating rod is located, said one of the motors having a shaft with a distal end thereof directed toward the support structure. The support and drive unit has a sufficient strength, vibration-resistant capability, and water resistance, and can be manufactured in a compact size.

11 Claims, 15 Drawing Figures

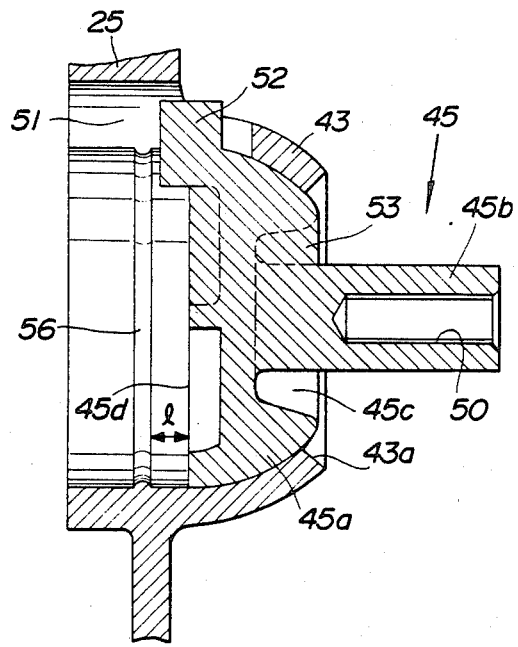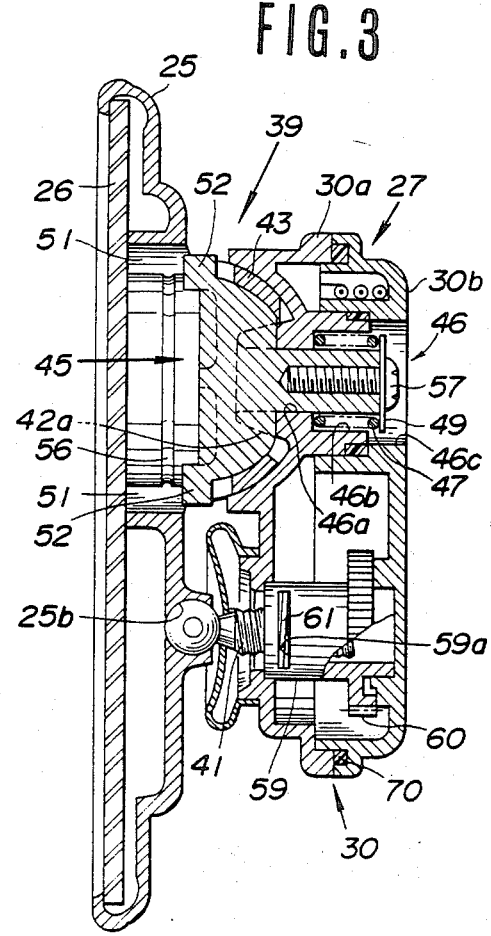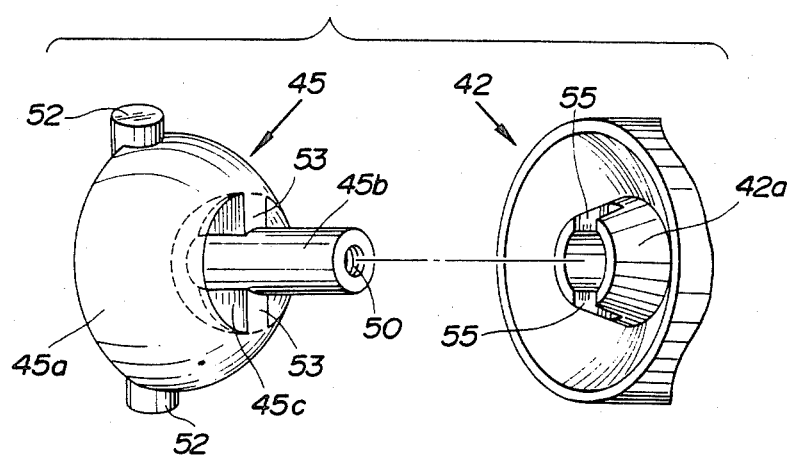

SUPPORT AND DRIVE UNIT FOR MIRROR DEVICES

BACKGROUND OF THE INVENTION

1. Field of the Invention

The present invention relates to a mirror device, and more particularly to a support and drive unit for a motor-driven mirror device which can be remotely controlled for adjusting the angle of inclination of a mirror holder having a mirror.

2. Description of the Prior Art

Mirror devices are used in many places to gain fields of view which would be difficult to achieve through direct view. Some of such mirror devices are often required to have the angle of mirror surfaces adjusted. In particular, outside rear view or side view mirrors on automobiles are relatively frequently adjusted to tilt the mirror surfaces to meet the position of the driver's eyes, and various devices for remotely controlling the mirrors for such angle adjustment have been proposed. The proposed devices ordinarily include a housing, a mirror holder which has a mirror and is accommodated in the housing, and a support and drive unit for supporting and adjusting the mirror holder. In many arrangements, the support and drive unit includes a motor for controlling the mirror holder with ease.

The support and device unit is required to have a highly strong support structure for supporting the mirror holder since the mirror should be subjected only to small vibrations while the automobile vibrates to a relatively large extent when it runs. The mirror device is also required to be sufficiently resistant to water, and able to be assembled easily. The mirror holder should be easily replaceable because the mirror is more likely to be damaged than the other components, i.e., the housing and the support and drive unit; and the cost of repair would be low if only the mirror and the mirror holder were replaceable.

One of the most important requirements which the support and drive unit for the automotive outside rear or side view mirror is compactness. However, the compactness requirement has not been met sufficiently because of the foregoing various demands.

SUMMARY OF THE INVENTION

The present invention effectively overcomes the foregoing problems.

It is an object of the present invention to provide a support and drive unit for mirror devices which includes a support structure having a high strength, capable of suppressing mirror holder vibrations effectively, and having a compact construction.

Another object of the present invention is to provide a support and drive unit for mirror devices which has a sufficient water-resistant capability, can be assembled with ease, includes an easily replaceable mirror holder, and is of a compact structure.

According to the present invention, a support and drive unit for a mirror device having a housing and a mirror holder with a mirror, includes a casing adapted to be disposed in the housing, a support structure adapted to pivotally support the mirror holder with the mirror, and means for adjusting the mirror holder. The adjusting means comprises first and second actuating rods axially movably mounted on the casing, and a pair of motors disposed in the casing for moving the actuating rods, respectively, through coupling means. The actuating rods have front ends adapted to be pivotally coupled to the mirror holder, and are spaced substantially right-angularly from each other around the center of the support structure. One of the motors is disposed in an area defined between a side of a plane extending through the center of the support structure and a central axis of the first actuating rod and in which the second actuating rod is located, and a side of a plane extending through the center of the support structure and a central axis of the second actuating rod and in which the first actuating rod is located, such one of the motors having a shaft with a distal end thereof directed toward the support structure.

According to a preferred embodiment of the present invention, the support structure and the first and second actuating rods are coupled to the mirror holder having the mirror for pivotal movement about respective points which are positioned such that the mirror holder with mirror has a center of gravity located within a triangle with the points positioned at vertexes thereof.

Furthermore, the support structure comprises a socket on the casing, the socket having a semispherical concave surface, a core member having a semispherical convex surface concentric with respect to the semispherical concave surface of the socket and coacting with the socket, and a semispherically shell-shaped flange on the mirror holder having the mirror, the flange being slidably sandwiched between the semispherical concave surface of the socket and the semispherical convex surface of the core member.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a cross-sectional view taken along line 3—3 of FIG 1.

FIG. 4 is an exploded perspective view of a core member and a socket in the support and drive unit illustrated in FIG. 1.

FIG. 5 is a cross-sectional view taken along line 5—5 of FIG. 1, showing the core member and a flange of the mirror holder.

DETAILED DESCRIPTION OF THE PREFERRED EMBODIMENTS

The present invention will be described as being embodied in mirror adjusting devices for outside rear view mirrors mounted on automobile doors which are commonly referred to as "side view mirrors". The terms "front" and "rear" are used herein to indicate a direction in which the mirror surface of the mirror faces and an opposite direction, respectively, and other terms similar in meaning to the terms "front" and "rear" are consistent with the above definition.

Figure 1:
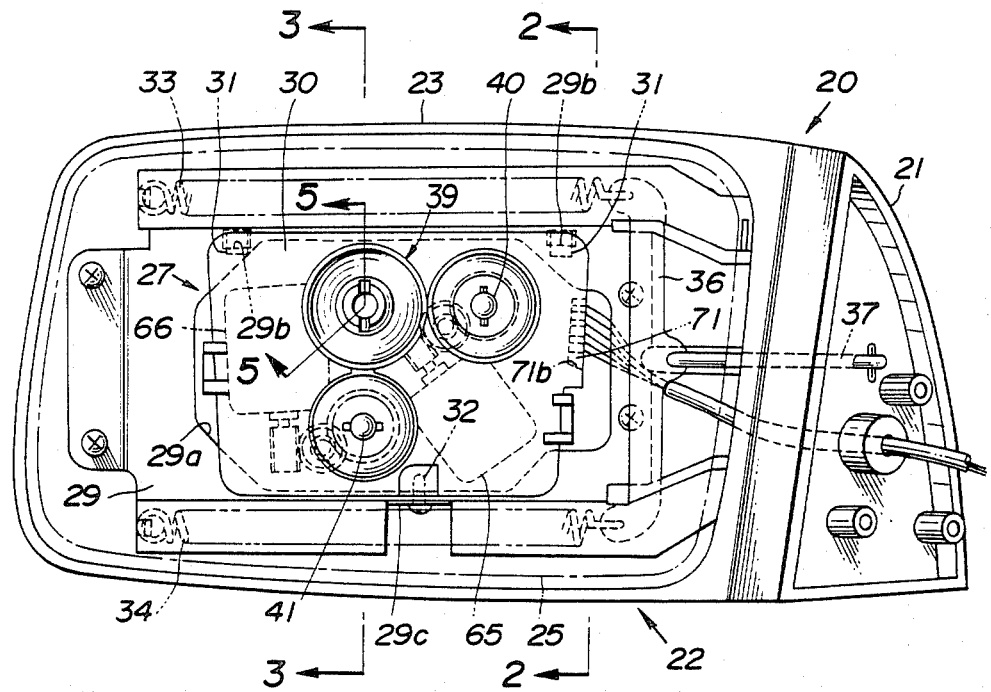
FIG. 1 is a front elevational view of an outside rear view or side view mirror, with a mirror holder omitted from illustration, having a mirror support and drive unit according to a preferred embodiment of the present invention.

A rearview mirror 20 as shown in FIG. 1 comprises a base 21 to be attached to a side surface of an automobile door, and a mirror device proper 22 resiliently supported on the base 21 so as to be tiltable back and forth. The mirror device proper 22 has a housing 23 having a front opening, and a mirror holder 25 (FIG. 3) accommodated in the housing 23 and supporting a mirror 26. The mirror holder 25 is virtually omitted from illustration in FIG. 1 and has only its outline denoted by the reference numeral 25 in FIG. 1.

Figure 2:
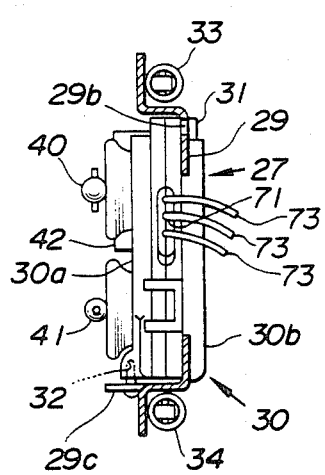
FIG. 2 is a side elevational view of the support and drive unit shown in FIG. 1, taken along line 2—2 of FIG. 1.

In the housing 23, there is disposed a support and drive unit 27 for pivotally supporting the mirror holder 25 to adjust the inclination thereof. The support and drive unit 27 is mounted on a support plate 29 having a central opening 29a and fixed to the housing 23. The support and drive unit 27 has a casing 30 in the shape of a rectangular parallelepiped having a relatively small thickness. As shown in FIGS. 1 and 2, the casing 30 has a pair of L-shaped hooks 31 disposed on an upper edge thereof and a screw hole 32 defined in a lower edge thereof. The support and drive unit 27 can be attached to the support plate 29 by placing the support and drive unit 27 in the central opening 29a in the support plate 29, positioning the L-shaped hooks 31 in holes 29b defined in the support plate 29, and fastening a raised member 29c of the support plate 29 to the casing 30 with a screw threaded through the raised member 29c into the screw hole 32. Coil springs 33, 34 have ends engaging upper and lower portions of the support plate 29 and opposite ends engaging both ends, respectively, of a coupling plate 36. The coupling plate 36 has a central portion swingably connected by a link member 37 to the base 21. Therefore, the mirror device proper 22 is normally resiliently held against and supported on the base 21 under the forces of the springs 33, 34.

The support and drive unit 27 has a support structure 39 (FIG. 3) by which the mirror holder 25 is pivotally supported on an outer surface of the casing 30. A pair of first and second actuating rods 40, 41 is disposed in substantially right-angularly spaced relation to each other around the center of the support structure 39, that is, in positions rightward and downward of the support structure 39. The actuating rods 40, 41 are movable in directions out of and into the casing 30 by means of motors and coupling mechanisms. The actuating rods 40, 41 have front ends pivotally connected to the rear surface of the mirror holder 25 by ball-and-socket joints to allow the mirror holder 25 to be angularly adjusted. The mirror holder 25 is disposed in covering relation to a front opening in the housing 23.

The support structure 39 will now be described in greater detail. The support structure 39 is positioned in an upper position and centrally in the transverse direction of the casing 30 as shown in FIG. 1. As illustrated in FIGS. 1 through 5, the support structure 39 comprises a socket 42 on the front or outer surface of the casing 30, the socket 42 having a semispherical recess, a flange 43 on the rear surface of the mirror holder 25, the flange 43 being in the form of a spherical shell and having a central opening 43a, and a core member 45. The core member 45 comprises a head 45a having a semispherical surface extending concentrically with respect to the semispherical surface of the socket 42, and a shank 45b extending rearwardly from the head 45a. The socket 42 has a central support hole 46 extending rearwardly through the casing 30. The support hole 46 includes a front bearing portion 46a of a relatively small diameter in which the shank 45b of the core member 45 is fitted, a middle hole 46b of a diameter larger than that of the front bearing portion 46a, the middle hole 46b accommodating a coil spring 47 therein, and a rear hole 46c of a diameter larger than that of the middle hole 46b, the rear hole 46c accommodating a washer 49 engaging the coil spring 47. The socket 42 also has a forwardly projecting collar 42a having an inner surface contiguous to an inner surface of the bearing hole 46a and an outer surface progressively tapered toward a front end thereof. The core member 45 has an annular depression 45c defined in the head 45a around the end of the shank 45b and shaped to receive the collar 42a of the socket 42. The annular depression 45c has an outside diameter selected to provide a clearance between the annular depression 45c and the outer peripheral surface of the collar 42a when the core member 45 is mounted in position. The shank 45b has an internally threaded hole 50 extending axially and defined in a distal end of the shank 45b. The head 45a has on its outermost peripheral surface a pair of vertically aligned, diametrically opposite trunnions 52 engaging respectively in trunnion slots 51 defined in the mirror holder 25 for preventing the core member 45 from rotating about the axis thereof relative to the mirror holder 25. In addition, as shown in FIG. 4, the core member 45 has vertically aligned, diametrically opposite ribs 53 disposed in the annular depression 45c engaging respectively in recesses 55 defined in the collar 42a of the socket 42. The ribs 53 disposed in the corresponding recesses 55 are effective in preventing the core member 45 from rotating about the axis thereof and hence preventing the mirror holder 25 from rotating about the axis of the support structure 39.

As assembled, the collar 42a of the socket 42 extends through the central opening 43a in the flange 43 of the mirror holder 25, as shown in FIG. 3. Therefore, the central opening 43a is required to have a diameter such that the edge of the central opening 43a is wide enough to allow the mirror holder 25 to be adjusted through a desired angle without interfering with the collar 42a of the socket 42. The flange 43 has on an inner peripheral surface a stopper 56 comprising an annular ridge which is interrupted by the holes 51. Although the illustrated annular stopper 56 has a semicircular cross section, it may be of another cross-sectional shape. The stopper 56 may comprise a series of teeth arranged in a circle, rather than the annular ridge. The stopper 56 should be dimensioned and shaped in order to abut against the outer periphery of the head 45a of the core member 45. When the core member 45 is pressed with a relatively strong force, the core member 45 should be axially moved past the stopper 56, and otherwise the core member 45 should be limited in its movement by the stopper 56. The stopper 56 is positioned such that after the parts have been assembled together, a front end 45d of the head 45a is spaced from the stopper 56 by a sufficiently large distance l (FIG. 5) so that the stopper 56 and the head 45a will not interfere with each other when the mirror holder 25 is angularly moved.

Assembly and operation of the support structure 39 as thus constructed will now be described. For assembly, the shank 45b of the core member 45 is inserted rearwardly through the central opening 43a in the flange 43 of the mirror holder 25 which has been fitted with no mirror as yet. At this time, the shank 45b is forcibly pushed in until the outer peripheral edge of the core member 45 rides over the stopper 56 and the head 45a is brought into abutment against the inner surface of the flange 43. The outer peripheral edge of the core member 45 is now retained by the stopper 56 against removal. Where the mirror holder 25 is made of thermoplastic synthetic resin, the mirror holder 25 is heated, and then a mirror 26 is fitted in the mirror holder 25 to produce a subassembly. Thereafter, the shank 45b of the core member 45 which projects from the mirror holder 25 is inserted rearwardly into the bearing hole 46a in the support and drive unit 39. The coil spring 47 is fitted into the hole 46b over the shank 45b from behind the unit 27. The rear end of the coil spring 47 is pushed in by the washer 49 which is fastened to the shank 45b by a screw 57 threaded in the hole 50 (FIG. 3). At the time of fastening the washer 49, the entire outer peripheral edge of the core member 45 is held in engagement with the stopper 56 against retracted movement. Therefore, the washer 49 can easily be fastened to the shank 45b. This facilitates the assembling operation. Since the washer 49 is removable, the mirror holder 25 can be replaced with another mirror holder in use.

Figure 6:
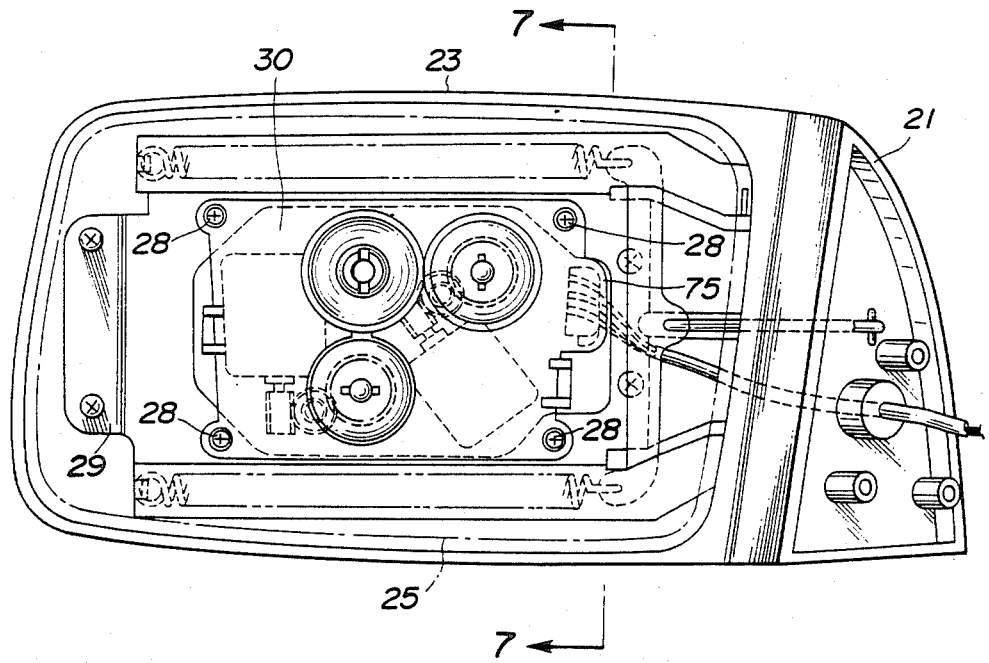
FIG. 6 is a front elevational view of a modified outside rear view or side view mirror.
Figure 8:
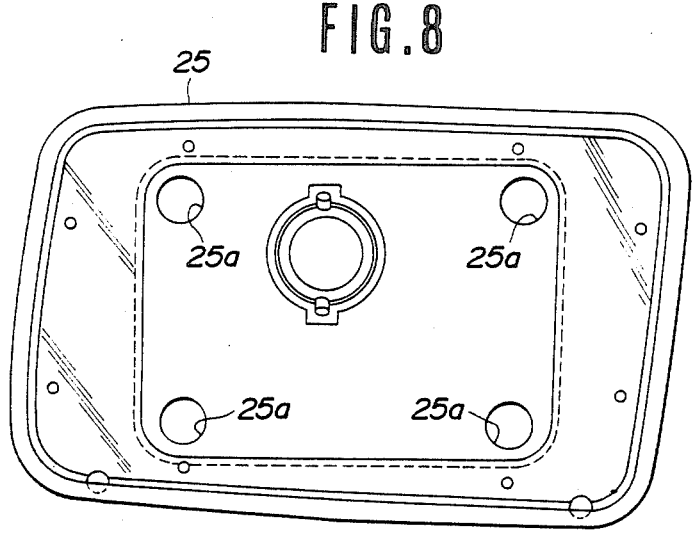
FIG. 8 is a front elevational view of a mirror holder in the rearview mirror of FIG. 6.
Figure 7:
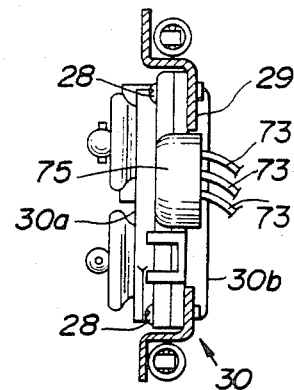
FIG. 7 is a side elevational view of a support and drive unit in the mirror of FIG. 6, taken along line 7—7 of FIG. 6.

The support structure will be assembled in a different process if the support and drive unit is attached to the support plate in a different manner. More specifically, FIGS. 6 through 8 show a modification in which a support and drive unit 27 is secured to a support plate 29 by screws 28 extending through the corners of the support and drive unit 27. A mirror holder 25 has holes 25a through which a screwdriver bit can pass to tighten the screws 28. With this arrangement, a mirror must be finally attached to the mirror holder 25 in the process of assembling the outside rear view or side view mirror.

The functions which the support structure 39 has will be described with reference to FIGS. 3 through 5. The semispherically shell-shaped flange 43 of the mirror holder 25 is sandwiched between the semispherical concave surface of the socket 42 and the semispherical convex surface of the core member 45. The opposite surfaces of the flange 43 are held slidably against these semispherical concave and convex surfaces. Through such slidable engagement between the semispherical surfaces, the mirror holder 25 is angularly movable in any direction about the spherical center of the flange 43. Furthermore, the flange 43 is resiliently supported against unwanted wobbling movement under the force of the coil spring 47.

As shown in FIG. 4, the core member 45 is supported on the collar 42a projecting forwardly from the center of the socket 42. The collar 42 allows the bearing hole 46a to have a sufficient axial length for supporting the core member 45, which may be of a limited overall length.

The portion of the support structure 39 in which the shank 45b is fitted is subjected to a supporting stress equivalent to a moment determined by the weights of the mirror holder 25 and the mirror 26 and the distance from the mirror holder 25 to the shank-fitting portion. Since, however, the core 45 has the annular depression 45c in which the collar 42a is disposed, the distance from the mirror holder 25 to the shank-fitting portion is reduced, with the shank fitting portion located close to the center of angular movement of the mirror holder 25. As a result, the supporting stress or moment is lowered.

The collar 42a and the annular depression 45c have the recesses 55 and the ribs 53, respectively, engaging with each other for preventing relative rotation at positions most remote from the central axis of the shank 45b. This permits a more reliable and stronger ability to prevent relative rotation than conventional rotation-preventing means provided in a radially inward portion of the shank.

Figure 9:
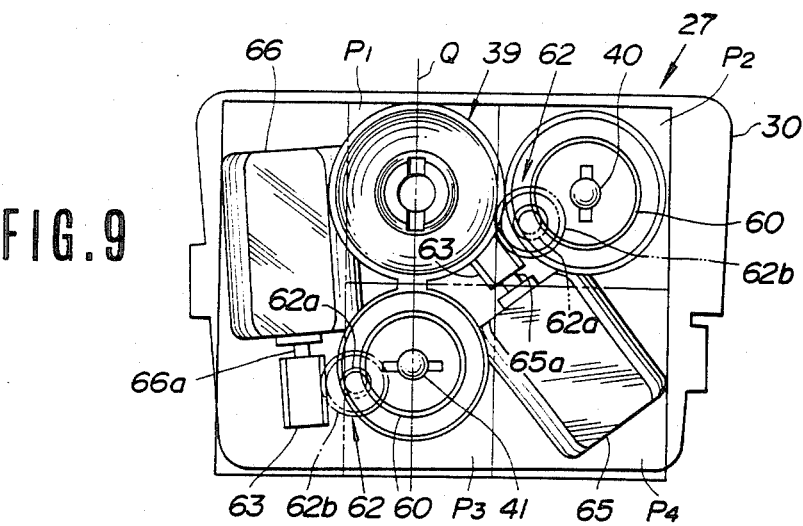
FIG. 9 is a view showing a layout of components of the support and drive unit shown in FIG. 1.

The first actuating rod 40 is disposed rightwardly of the support structure 39 for horizontally adjusting the angle of a field of view provided by the mirror holder 25. The second actuating rod 41 is disposed downwardly of the support structure 39 for vertically adjusting the angle of a field of view provided by the mirror holder 25. The actuating rods 40, 41 have axes extending substantially perpendicularly to the mirror holder 25, and have externally threaded outer peripheral surfaces. Balls are mounted respectively on the front ends of the actuating rods 40, 41 and have pins extending perpendicularly to the axes thereof. These balls are slidably received respectively in sockets 25b (FIG. 3) defined in the mirror holder 25 so that the actuating rods 40, 41 and the mirror holder 25 are pivotally coupled with each other. The pins on the balls serve to prevent the actuating rods 40, 41 from turning about their own axes. The actuating rods 40, 41 are inserted respectively in tubular rotors 59 rotatably supported in the casing 30 and having gears 60 on their outer peripheral surfaces. The tubular rotors 59 have slits 59a defined adjacent to front ends thereof and extending perpendicularly to the axes of the tubular rotors 59. In each of the slits 59a, there is disposed a U-shaped clutch pin 61 angularly movable in unison with the tubular rotor 59. Under normal operation, the clutch pin 61 has ends engaging in the grooves in the externally threaded surface of the actuating rod. When the tubular rotors 59 are rotated in one direction or the other, the actuating rods 40, 41 are axially moved to cause the mirror holder 25 to swing about the support structure 12. As shown in FIG. 9, a pair of speed reducer gearings 62 is disposed adjacent respectively to the tubular rotors 59. Each of the speed reducer gearings 62 comprises a small gear 62a and a worm wheel 62b which are integral with each other. The small gears 62a are held in mesh with the gears 60 on the tubular rotors 59, respectively. The worm wheels 62b are held in mesh with worms 63 mounted on the shafts 65a, 66a of motors 65, 66, respectively. The motor 66 for driving the second actuating rod 41 has its shaft 66a directed such that the axis thereof is substantially parallel to a straight line Q connecting the center of the support structure 39 and the center of the actuating rod 41. The motor 65 for driving the first actuating rod 40 is disposed in a space defined by the support structure 39 and the actuating rods 40, 41. The shaft 65a of the motor 65 has a front end directed substantially toward the support structure 39. In other words, an extension of a central axis of shaft 65a will substantially pass through the support structure 39. Generally speaking, the support structure 39, the first and second actuating rods 40, 41 and the pair of motors 65, 66 are all compactly disposed (at least partially) in a common plane defined in the support and drive unit 27, and in a substantially non-overlapping manner. The space defined by the support structure 39 and the actuating rods 40, 41 means an area defined by a side of a plane extending through the center of the support structure 39 and the central axis of the first actuating rod 40 and facing the second actuating rod 41, and a side of a plane extending through the the center of the support structure 39 and the central axis of the second actuating rod 41 and facing the first actuating rod 40. More specifically, as shown in FIG. 9, the support structure 39, the first actuating rod 40, the second actuating rod 41, and the motor 65 are positioned respectively in four, substantially equal rectangular regions P1, P2, P3, and P4 defined by the dashed lines. These parts are disposed effectively in the respective regions of minimum dimensions without overlapping each other. With the front end of the shaft 65a being directed toward the support structure 39, the motor 65 is located as close to the support structure 39 as possible, with the consequence that when the mirror holder 25 is tilted, the angular range of tilting movement thereof will not be limited in any way by the motor 65.

Therefore, the components required to operate the support and drive unit 27 are efficiently housed in a minimum space without overlapping each other and without leaving any substantial dead space. The support and drive unit 27 can be of as small a thickness as possible, and of a small and compact size. Since the support structure 39 does not overlap the other parts such as the motors, it can be of an increased dimension in the direction of thickness of the support and drive unit 27. Therefore, the support structure 39 has an increased area of slidable contact with the mirror holder 25 for protection against possible damage due to vibrations to which the mirror device will be subjected. The shank 45b of the core member 45 extends through the support and drive unit 27 to the rear surface thereof and is retained in position by the screw 57. This arrangement affords an increased supporting strength for the mirror holder 25 and allows the mirror holder 25 to be attached to and detached from the support and drive unit 27 with utmost ease.

Figure 10:
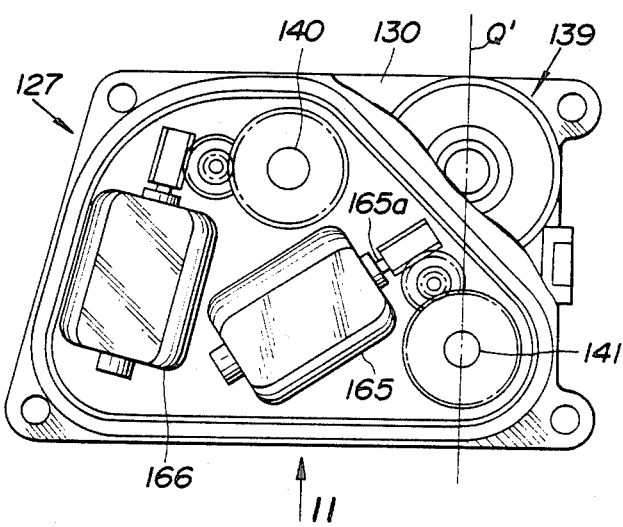
FIG. 10 is a front elevational view, partly cut away, of a modified support and drive unit.
Figure 11:
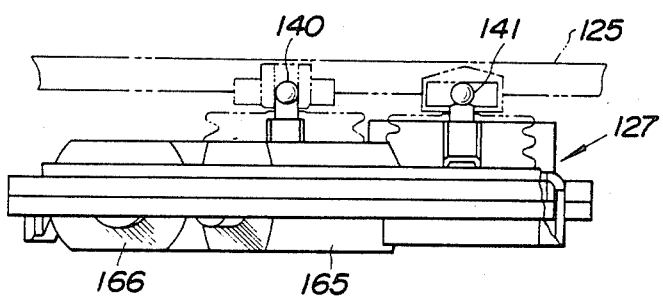
FIG. 11 is a view of the support and drive unit of FIG. 10, as seen in the direction of the arrow 11 of FIG. 10.

FIGS. 10 and 11 illustrates a modification in which the motors are arranged in a different layout and the casing has a different shape. As shown in FIG. 10, a support and drive unit 127 includes a support structure 139 by which a mirror holder 125 is pivotally supported, a first actuating rod 140 disposed leftwardly of the support structure 139, and a second actuating rod 141 disposed downwardly of the support structure 139. A motor 165 is placed in a space defined by the support structure 139 and the first and second actuating rods 140, 141, and has a shaft 165a with its distal end directed toward the support structure 139. Another motor 166 has an axis extending substantially parallel to a straight line Q' connecting the center of the support structure 139 and the center of the second actuating rod 141. The support and drive unit 127 shown in FIGS. 10 through 11 is as advantageous as the support and drive unit shown in FIG. 1.

More specifically, the support and drive unit 127 has its components laid out efficiently without leaving any substantial dead space, and hence can be of a reduced thickness and a small and compact size. As a consequence, a relatively large space is rendered available for the support structure 139 supporting the mirror holder 125, resulting in a sufficiently large area of slidable contact between the support structure 139 and the mirror holder 125. The support structure 139 is therefore of an increased supporting strength and an increased vibration-resistant capability.

Inasmuch as the mirror holder 125 is detachably mounted on the support and drive unit 127, the mirror holder 125, upon failure or damage, can easily be replaced with a new one at a low cost. This allows the support and drive unit 127 to be maintained and serviced with ease.

The casing 30 of the support and drive unit 27 will be described in more detail with reference to FIGS. 1 through 3 and 12.

Figure 12:
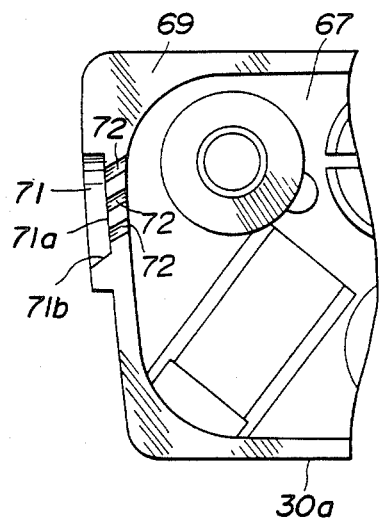
FIG. 12 is a fragmentary rear elevational view of a front casing half of the support and drive unit of FIG. 1.

As illustrated in FIG. 2, the casing 30 comprises a front casing half 30a and a rear casing half 30b. As shown in FIG. 12, the front casing half 30a has on an inner surface thereof a housing section 67 accommodating the motors and the gears therein and a mating surface 69 for mating engagement with the rear casing half 30b. The mating surface 69 has a given width to provide a good sealing ability between the front and rear casing halves 30a, 30b. The rear casing half 30b has a groove defined in and along a peripheral mating surface and receiving a seal member or gasket 70 (FIG. 3).

Since the mirror holder 25 is movable, there is a clearance between the mirror holder 25 and the housing 23 accommodating the mirror holder 25 therein, permitting rainwater, washing water or muddy water to find its way through such a clearance into the housing 23 and to be attached to the casing 30 of the support and drive unit 27. A wire harness connected to the motors extends through wire holes in the casing 30. When water having entered the housing 23 is attached to the outer surface of the casing 30 around these wire holes, the water may enter the support and drive unit 27 through the wire holes when the temperature in the casing 30 is changed.

To prevent the entry of water into the support and drive unit 27, the following arrangement is incorporated. The casing 30 has a cavity 71 defined in an outer side wall thereof and comprising cavity halves defined in the mating surfaces of the casing halves 30a, 30b.

The cavity 71 has a substantially flat bottom 71a where wire holes 72 are defined through the casing 30 in communication with the interior thereof. Although three wire holes 72 are shown, only a single hole may be defined to pass the wire harness. The wire holes 72 are formed by defining grooves of a semicircular cross section in each of the casing halves 30a, 30b and combining the grooves together, the completed wire holes 72 having a circular cross section. As shown in FIG. 12, the wire holes 72 preferably extend obliquely downwardly in an outward direction to give them an increased length and position their outer ends at a lower level than inner ends thereof, so that water or the like will not easily enter the casing 30 through the wire holes 72. The side of the casing 30 in which the cavity 71 is defined extends outwardly in an upward direction to prevent water from entering the cavity 71. The cavity 71 has a lower side wall 71b inclined donwardly and outwardly to cause any water in the cavity 71 to drip off the cavity 71. The cavity 71 should preferably have as large a depth as possible. The wires connected to the motors 65, 66 and extending out of the casing 30 through the wire holes 72 are denoted at 73 in FIG. 2.

Even when water such as rainwater or muddy water enters the housing 23, it will not be attached to the wires 73 at the outlet ends of the holes 72 since they are surrounded in spaced relation by the wall of the cavity 71. Any water attached to the casing 30 above the cavity 71 will drop off the casing 30 without entering the cavity 71. Therefore, no water will find its way into the casing 30 through the holes 72. The cavity 71 is simply defined in the mating surfaces of the casing halves 30a, 30b, and the casing 30 does not need any special water-resistant arrangement which would make the casing 30 larger in size.

Figure 13:
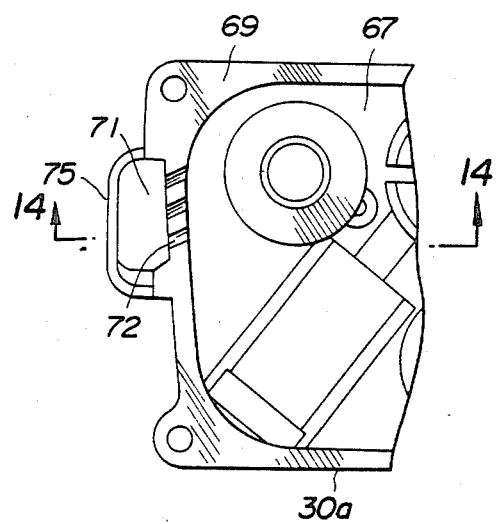
FIG. 13 is a fragmentary rear elevational view of a front casing half of the support and drive unit of FIG. 6.
Figure 14:
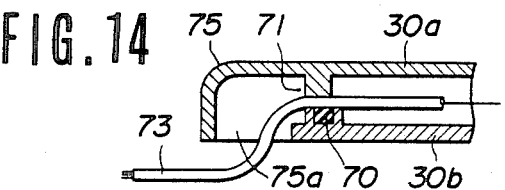
FIG. 14 is a cross-sectional view taken along line 14—14 of FIG. 13.

The support and drive unit shown in FIGS. 6 through 8 incorporates therein a modified water-resistant construction. As shown in FIG. 7, a guide 75 is disposed on an outer wall of the front casing half 30a in covering and guiding relation to the wires 73. The guide 75 is disposed on the front casing half 30a since water enters from the front side of the mirror device. More specifically, FIGS. 13 and 14 show the modified water-resistant construction, in which the guide 75 projects laterally and defines a mouth 75a opening in a direction normal to the direction in which the cavity 71 opens. The guide 75 thus extends in surrounding relation to the cavity half defined in the front casing half 30a.

The support and drive unit 27 shown in FIG. 1 is characterized by the position in which the support structure 39 and the actuating rods 40, 41 are coupled to the mirror holder 25. Such position will be described with reference to FIG. 15 in which identical parts are denoted by identical reference characters used in FIG. 1.

Figure 15:
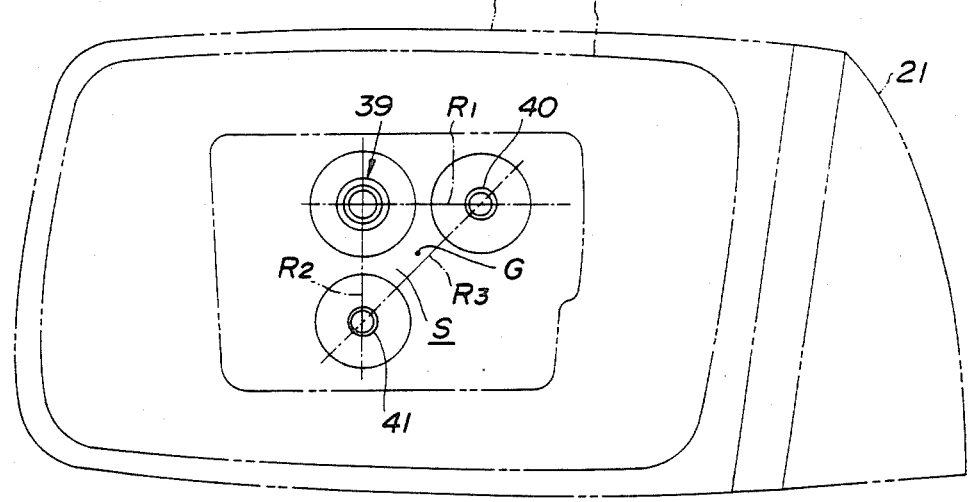
FIG. 15 is a schematic view of the mirror holder, as supported in position, for the mirror illustrated in FIG. 1.

As described above, the mirror holder 25 is supported by the actuating rods 40, 41 as well as by the support structure 39. The position in which the mirror holder 25 is supported by the actuating rods 40, 41 and the support structure 39 is selected in an optimum manner dependent on supporting loads at points of the supporting structure 39 and the actuating rods 40, 41. More specifically, FIG. 15 shows a straight line R1 connecting the center of the support structure 39 and the axis of the actuating rod 40, a straight line R2 connecting the center of the support structure 39 and the axis of the actuating rod 41, and a straight line R3 connecting the axes of the actuating rods 40, 41. The straight lines R1, R2, R3 jointly define a triangle S therebetween. According to the present invention, the center of gravity G of the mirror holder 25 including the mirror 26 is positioned within the triangle S. On the contrary, many conventional support and drive units for use in automobile side view mirrors have been designed such that the center of gravity of the mirror holder (with mirror) is positioned as close to the support structure as possible. In other prior support and drive units, the position of the support structure with respect to the mirror holder is determined in view of the ease with which the mirror holder is pivotally moved. Therefore, the foregoing arrangement of the support structure and the actuating rods with respect to the mirror holder according to the present invention for enabling the actuating rods to serve as additional support members is novel over the prior arrangements. The arrangement of the invention has the advantage of reducing the magnitude of vibrations of the mirror holder while the automobile is running to thereby give the driver a clearer field of view.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A support and drive unit for a mirror device having a housing and a mirror holder provided with a mirror, comprising:

(a) a casing adapted to be disposed in said housing;
    (b) a support structure adapted to pivotally support said mirror holder; and
    (c) means for adjusting said mirror holder;

said adjusting means comprising first and second actuating rods axially movably mounted in said casing, and a pair of motors disposed in said casing and operatively cooperating with said actuating rods so as to move said actuating rods, respectively, through coupling means;

said actuating rods having front ends adapted to be pivotally coupled to said mirror holder, and are spaced substantially right-angularly from each other around a center of said support structure; and one of said motor being disposed in an area defined between a side of a plane extending through the center of said support structure and a central axis of said first actuating rod and facing said second actuating rod, and a side of a plane extending through the center of said support structure and a central axis of said second actuating rod and facing said first actuating rod, said one of said motors having a shaft, an extension of a central axis of said shaft substantially passing through said support structure.

2. A support and drive unit according to claim 1, wherein said support structure and said first and second actuating rods are coupled to said mirror holder for pivotal movement about respective points which are positioned such that said mirror holder has a center of gravity located within a triangle with said points positioned at vertexes thereof.

3. A support and drive unit according to claim 1, wherein said support structure comprises a socket on said casing, said socket having a semispherical concave surface, a core member having a semispherical convex surface concentric with respect to said semispherical concave surface of said socket and coacting with said socket, and a semispherically shell-shaped flange on said mirror holder, said flange being slidably sandwiched between said semispherical concave surface of said socket and said semispherical convex surface of said core member.

4. A support and drive unit according to claim 3, wherein said core member comprises a head having said semispherical convex surface and a shank extending from said head, said socket having a central hole in which said shank is inserted and supported, and said flange having a central opening through which said shank extends.

5. A support and drive unit according to claim 4, wherein said flange has a stopper on an inner peripheral surface thereof for engagement with an outer peripheral edge of said head of said core member, such that when said core member is pushed with a relatively strong force, said core member is movable past said stopper, and otherwise said core member is prevented by said stopper from moving.

6. A support and drive unit according to claim 4, wherein said socket has a collar having an inner surface contiguous to an inner surface of said central hole in said socket, and said core member having an annular depression around said shank of said core member for receiving therein said collar of said socket.

7. A support and drive unit according to claim 6, wherein said collar and said annular depression have engagement members held in engagement with each other for preventing said core member from rotating about its own axis, including a mechanism disposed between said mirror holder and said core member for preventing said mirror holder and said core member from rotating with respect to each other around the axis of said core member.

8. A support and drive unit according to claim 1, including wires connected to said motors, said casing having at least one hole defined in a side wall thereof with said wires extending through said at least one hole, and said casing having a cavity defined in an outer surface thereof in surrounding relation to said at least one hole.

9. A support and drive unit according to claim 8, wherein said at least one hole extends obliquely downwardly in an outward direction so that water will not enter said casing through the at least one hole.

10. A support and drive unit according to claim 8, wherein said casing includes a guide covering for guiding said wires.

11. A support and drive unit for a mirror device having a housing and a mirror holder provided with a mirror, comprising:
   (a) a casing adapted to be disposed in said housing;
   (b) a support structure adapted to pivotally support said mirror holder; and
   (c) means for adjusting said mirror holder; said adjusting means comprising first and second actuating rods axially movably mounted in said casing, and a pair of motors disposed in said casing and operatively cooperating with said actuating rods so as to move said actuating rods, respectively, through coupling means;

said actuating rods having front ends adapted to be pivotally coupled to said mirror holder;

said support structure, said first and second actuating rods, and said pair of motors being compactly disposed in a common plane defind in said support and drive unit, and in a substantially non-overlapping manner; and one of said motors being disposed closely to said support structure and between said actuating rods.

* * * * *

UNITED STATES PATENT AND TRADEMARK OFFICE
CERTIFICATE OF CORRECTION

PATENT NO. : 4,693,571

DATED : September 15, 1987

INVENTOR(S) : Sakae KIMURA et al.

It is certified that error appears in the above-identified patent and that said Letters Patent is hereby corrected as shown below:

Column 1, line 28, change "device" to --drive--.
Column 2, line 61, delete "rearview".
Column 5, line 10, change "1" to --$\ell$--.

Signed and Sealed this

Twenty-sixth Day of April, 1988

Attest:

DONALD J. QUIGG

Attesting Officer     Commissioner of Patents and Trademarks